US008257991B1

(12) United States Patent
Park et al.

(10) Patent No.: US 8,257,991 B1

(45) Date of Patent: Sep. 4, 2012

(54) PROCESS FOR MANUFACTURING SHELL MEMBRANE FORCE AND DEFLECTION SENSOR

(75) Inventors: Yong-Lae Park, Stanford, CA (US); Behzad Moslehi, Los Altos, CA (US); Richard James Black, Menlo Park, CA (US); Mark R. Cutkosky, Palo Alto, CA (US); Kelvin K. Chau, Pleasanton, CA (US)

(73) Assignee: Intelligent Fiber Optic Systems, Inc., Santa Clara, CA (US)

( * ) Notice: Subject to any disclaimer, the term of this patent is extended or adjusted under 35 U.S.C. 154(b) by 0 days.

(21) Appl. No.: 13/042,168

(22) Filed: Mar. 7, 2011

Related U.S. Application Data

(63) Continuation of application No. 12/100,417, filed on Apr. 10, 2008, now Pat. No. 7,903,907.

(51) Int. Cl.

| | |
|---|---|
| ***H01L 21/00*** | (2006.01) |
| ***G02B 6/00*** | (2006.01) |
| ***G01J 1/04*** | (2006.01) |
| ***G01L 19/04*** | (2006.01) |

(52) U.S. Cl. ................ 438/31; 438/29; 385/12; 385/13; 385/100; 385/31; 385/37; 250/227.11; 250/227.14; 73/708; 264/1.24; 264/1.25; 264/1.27

(58) Field of Classification Search .................... 385/12, 385/13, 37, 31, 100, 123; 250/227.11, 227.14, 250/227.18, 227.23; 73/1.37, 1.71, 61, 67, 73/705, 744, 708; 438/29, 31; 264/1.24, 264/1.25, 1.27, 1.29, 1.7, 2.5

See application file for complete search history.

(56) References Cited

U.S. PATENT DOCUMENTS

| | | | | |
|---|---|---|---|---|
| 4,678,903 | A * | 7/1987 | Wlodarczyk et al. | 250/227.14 |
| 4,729,627 | A * | 3/1988 | Saito et al. | 385/13 |
| 4,733,068 | A * | 3/1988 | Thiele et al. | 250/227.14 |
| 4,932,262 | A | 6/1990 | Wlodarczyk | |
| 5,005,584 | A | 4/1991 | Little | |
| 5,425,273 | A * | 6/1995 | Chevalier | 73/705 |
| 5,633,494 | A * | 5/1997 | Danisch | 250/227.16 |
| 5,825,489 | A | 10/1998 | Lagakos et al. | |
| 6,080,982 | A * | 6/2000 | Cohen | 250/227.11 |
| 6,160,762 | A * | 12/2000 | Luscombe et al. | 367/149 |
| 6,233,374 | B1 * | 5/2001 | Ogle et al. | 385/13 |
| 6,278,811 | B1 * | 8/2001 | Hay et al. | 385/13 |
| 6,422,084 | B1 | 7/2002 | Fernald et al. | |
| 6,439,055 | B1 * | 8/2002 | Maron et al. | 73/705 |
| 6,452,667 | B1 * | 9/2002 | Fernald et al. | 356/73.1 |
| 6,559,437 | B1 * | 5/2003 | Pope et al. | 250/227.14 |
| 6,626,043 | B1 * | 9/2003 | Bailey et al. | 73/705 |
| 6,774,354 | B2 * | 8/2004 | Ames | 250/227.14 |
| 6,785,443 | B2 * | 8/2004 | Mendez et al. | 385/37 |

(Continued)

*Primary Examiner* — Brian Healy

(74) *Attorney, Agent, or Firm* — File-EE-Patents.com; Jay A. Chesavage

(57) ABSTRACT

A sensor for force is formed from an elastomeric cylinder having a region with apertures. The apertures have passageways formed between them, and an optical fiber is introduced into these passageways, where the optical fiber has a grating for measurement of tension positioned in the passageways between apertures. Optionally, a temperature measurement sensor is placed in or around the elastomer for temperature correction, and if required, a copper film may be deposited in the elastomer for reduced sensitivity to spot temperature variations in the elastomer near the sensors.

21 Claims, 12 Drawing Sheets

Sensor with elastomeric shell

100

102 Attachment Region

104 Sensing Region

106 Tip Region

U.S. PATENT DOCUMENTS 6,813,013 B2 11/2004 Fernald et al.
6,820,489 B2 * 11/2004 Fernald et al. .................. 73/705
6,959,604 B2 11/2005 Bryant et al.
7,047,816 B2 5/2006 Jones et al.
7,155,074 B2 12/2006 Kersey
7,266,261 B2 9/2007 Arias Vidal et al.
7,308,165 B2 12/2007 Arias Vidal et al.
7,315,666 B2 * 1/2008 Van Der Spek ................. 385/12
7,447,390 B2 11/2008 Dunphy et al.
7,458,273 B2 12/2008 Skinner et al.
7,520,176 B1 4/2009 Ko et al.
7,903,907 B1 * 3/2011 Park et al. ....................... 385/12
2004/0082844 A1 * 4/2004 Vardi et al. .................... 600/407
2006/0071158 A1 * 4/2006 Van Der Spek .......... 250/227.14

* cited by examiner

Sensor with elastomeric shell

Deflection, force applied at end

Front view

Side view

Deflection, force applied at lattice
*Figure 3C* Front view
*Figure 3D* Side view
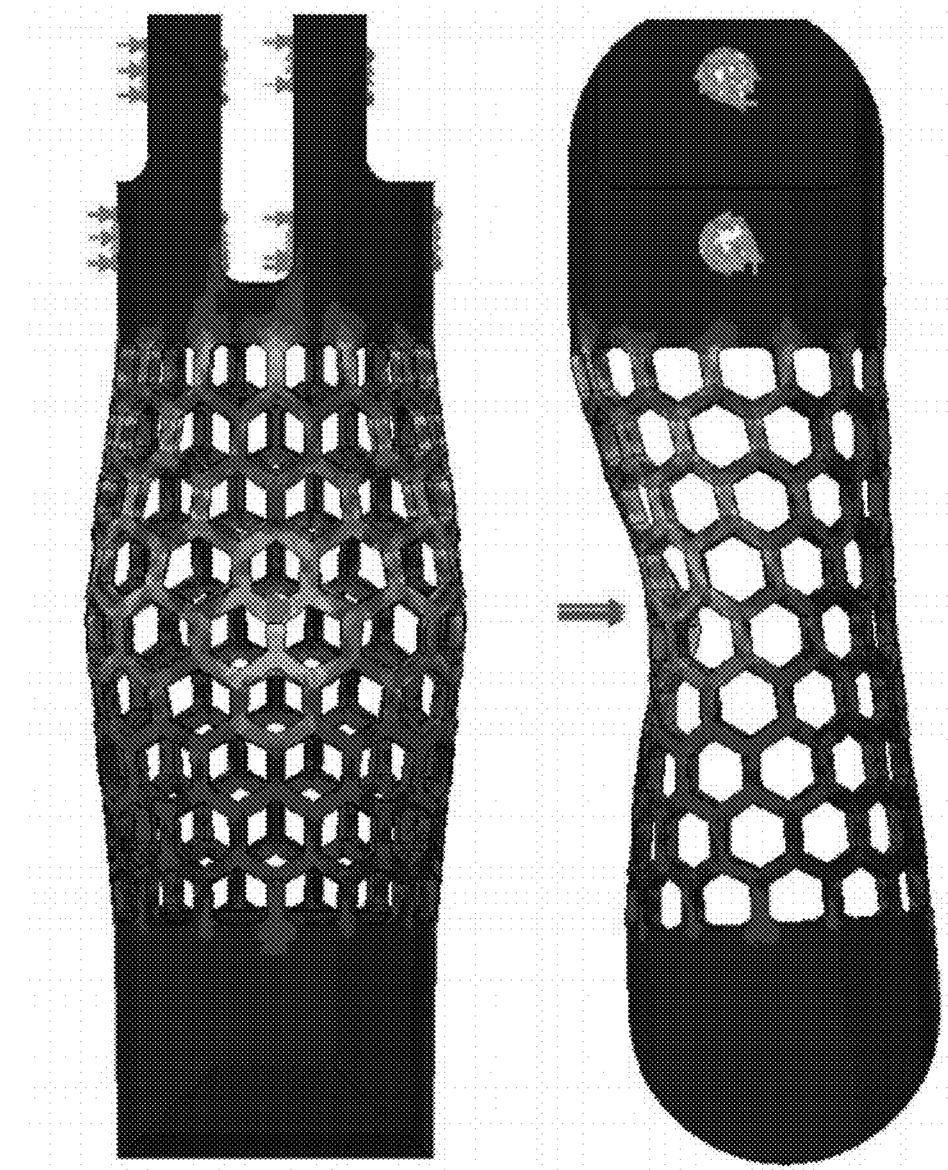

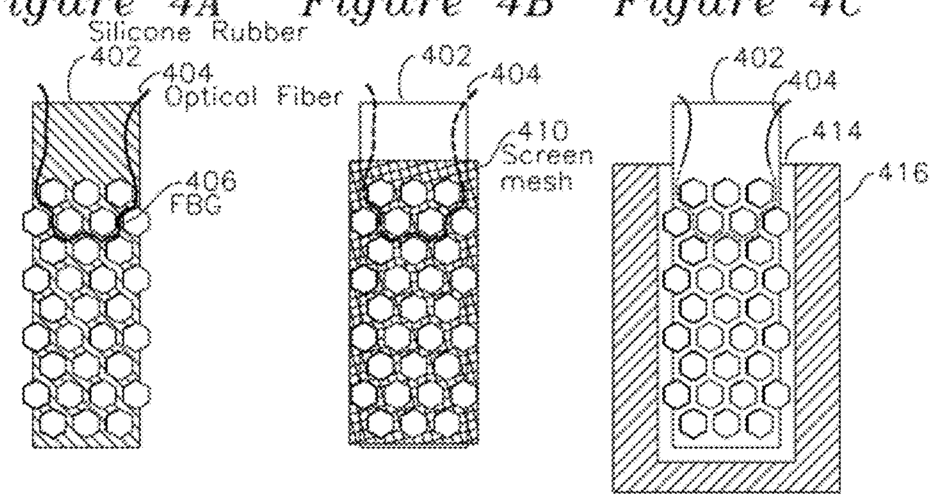
Figure 4A
Figure 4B
Figure 4C
Silicone Rubber
402
404
Optical Fiber
406
FBG
402
404
410
Screen
mesh
402
404
414
416
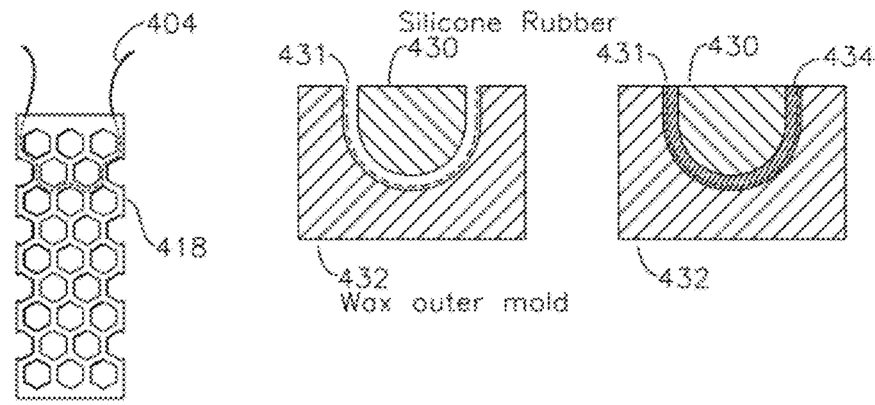
Figure 4D
Figure 4E
Figure 4F
404
418
Silicone Rubber
431
430
432
Wax outer mold
431
430
434
432

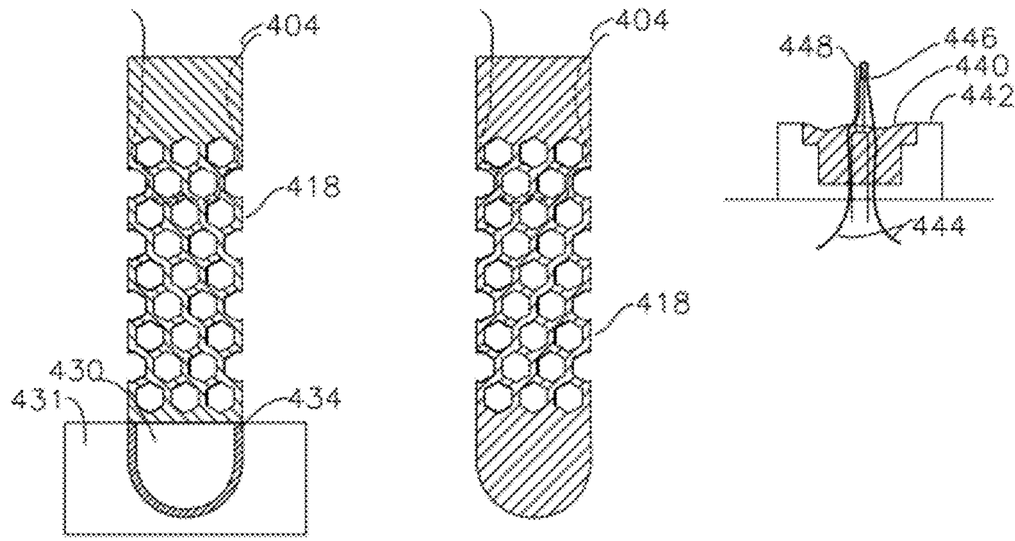
Figure 4G
Figure 4H
Figure 4I
404
418
430
431
434
404
418
448
446
440
442
444
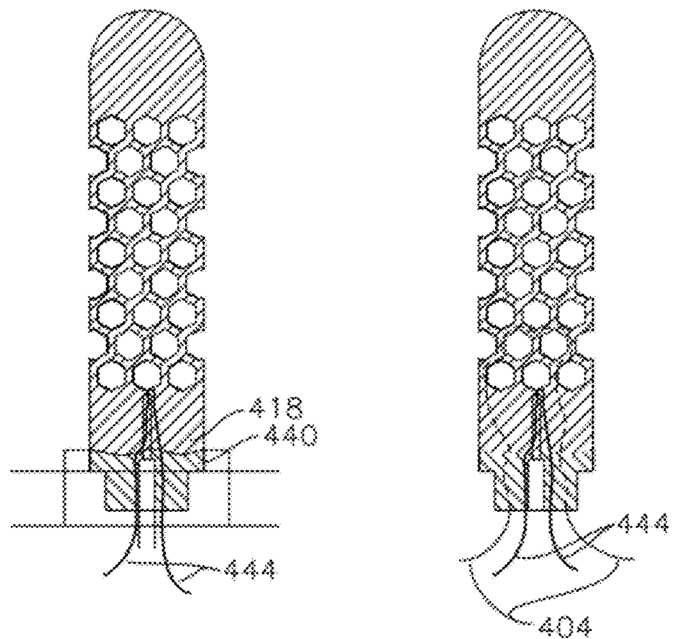
Figure 4J
Figure 4K
418
440
444
444
404

*Figure 8A*
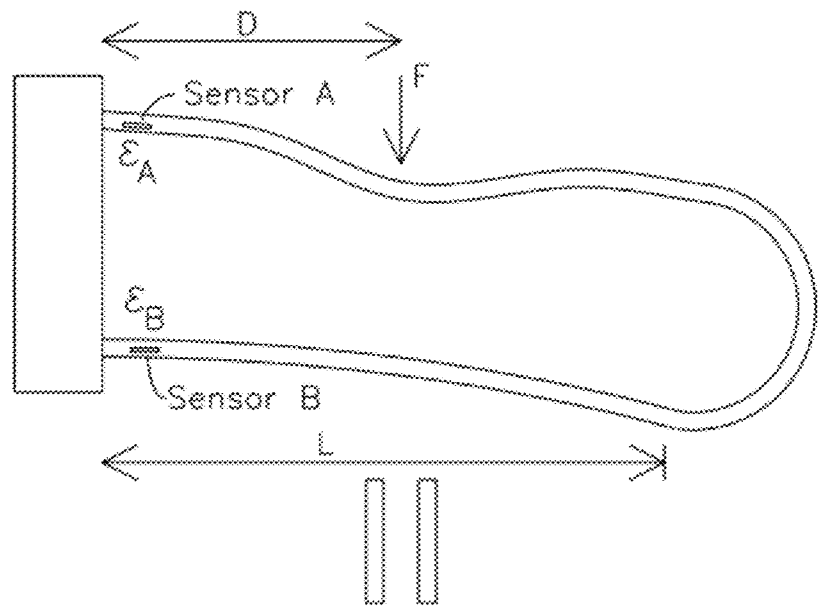
*Figure 8B*
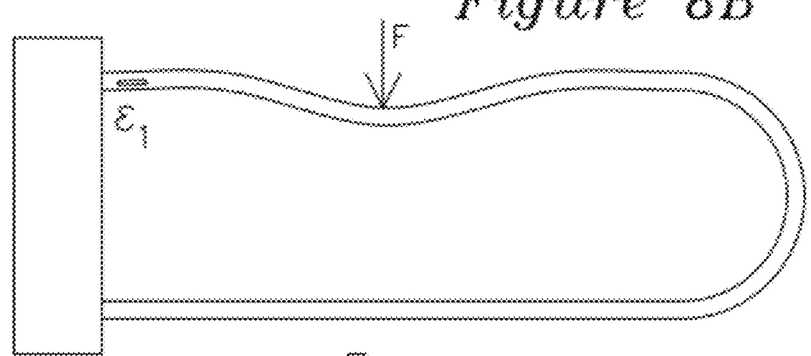
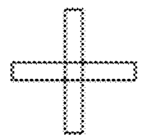
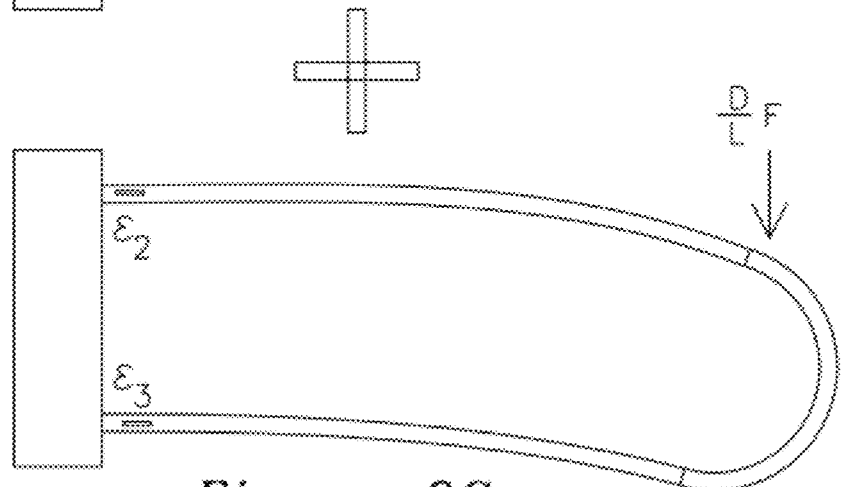
*Figure 8C*

1200
1202
1204
1206
1208
1210
λ1
λ2
λ3
1214
1216
1252
1st Splitter
1250
Psrc
SRC
1254
AWG filter
1244
1246
1248
1st DET
2nd DET
3rd DET
nth DET
1240
1242
Controller

PROCESS FOR MANUFACTURING SHELL MEMBRANE FORCE AND DEFLECTION SENSOR

The present patent application is a continuation of Ser. No. 12/100,417 filed Apr. 10, 2008, now issued as U.S. Pat. No. 7,903,907.

The present invention was developed under National Aeronautics and Space Administration (NASA) Contracts #NNJ05JC02C and NNJ06JA36C. The government has certain rights in this invention.

BACKGROUND OF THE INVENTION

1. Field of the Invention

The present invention relates to a force and deflection sensor. In particular, the invention relates to an flexible shell formed with an elastomer having passageways formed by apertures in the shell, with an optical fiber having one or more Bragg gratings positioned in the passageways for the measurement of force and deflection.

2. Description of the Related Art

Future robots are expected to free human operators from difficult and dangerous tasks requiring high dexterity in various environments. One example is an extra-vehicular repair of a manned spacecraft that would otherwise require hazardous work by human astronauts. Another example is robotic surgery in which accurate manipulation is crucial. Operating complicated tools and performing delicate tasks require a manipulator of great precision and coordination. Therefore, force sensing is one of the most critical requirements for this type of robot control. Typically, robots have a modest number of mechanical sensors, often associated with actuators or concentrated in a special device such as a force sensing wrist. As a result, robots often poorly identify and respond to unexpected and arbitrarily-located impacts.

One object of the invention is a light-weight, rugged appendages for a robot that features embedded sensors so that the robot can be more aware of both anticipated and unanticipated loads in real time. A particular class of optical sensors, Fiber Bragg Grating (FBG) sensors, is promising for space robotics and other applications where high sensitivity, multiplexing capability, immunity to electromagnetic noise, small size and resistance to harsh environments are particularly desirable. In addition, the biosafe and inert nature of optical fibers making them attractive for medical robotics. FBGs reflect light with a peak wavelength that shifts in proportion to the strain to which they are subjected. This wavelength shift provides the basis for strain sensing with typical values for the sensitivity to an axial strain being approximately 1.2 pm/microstrain at 1550 nm center wavelength. In combination with a prior art FBG interrogator, submicrostrain resolution measurements are possible. In addition, the strain response is linear with no indication of hysteresis at temperatures as high as 370° C. and, with appropriate processing, to over 650° C. Multiple FBG sensors can be placed along a single fiber and optically multiplexed. FBG sensors have previously been surface attached to or embedded in metal parts and composites to monitor stresses.

SUMMARY OF THE INVENTION

A sensor is formed from a thin shell of flexible material such as elastomer to form an attachment region, a sensing region, and a tip region. In one embodiment, the sensing region is a substantially cylindrical flexible shell and has a plurality of apertures forming passageways between the apertures. Optical fiber is routed through the passageways, with sensors located in the passageways prior to the application of the elastomeric material forming the flexible shell. Deflection of the sensor, such as by a force applied to the contact region, causes an incremental strain in one or more passageways where the optical fiber is located. The incremental strain results in a change of optical wavelength of reflection or transmittance at the sensor, thereby allowing the measurement of force or displacement.

BRIEF DESCRIPTION OF THE DRAWINGS

FIG. 3C is a front view of a sensor with a force applied to a sensing region.

FIG. 3D is a side view of a sensor with a force applied to a sensing region.

FIGS. 4A, 4B, 4C, 4D, 4E, 4F, 4G, 4H, 4I, 4J, 4K show process steps for forming an elastomeric sensor.

FIG. 8A is a cross section view of deformation at the sensor region.

FIGS. 8B and 8C are superposition views of the force-induced deformation of FIG. 8A.

DETAILED DESCRIPTION

Figure 1:
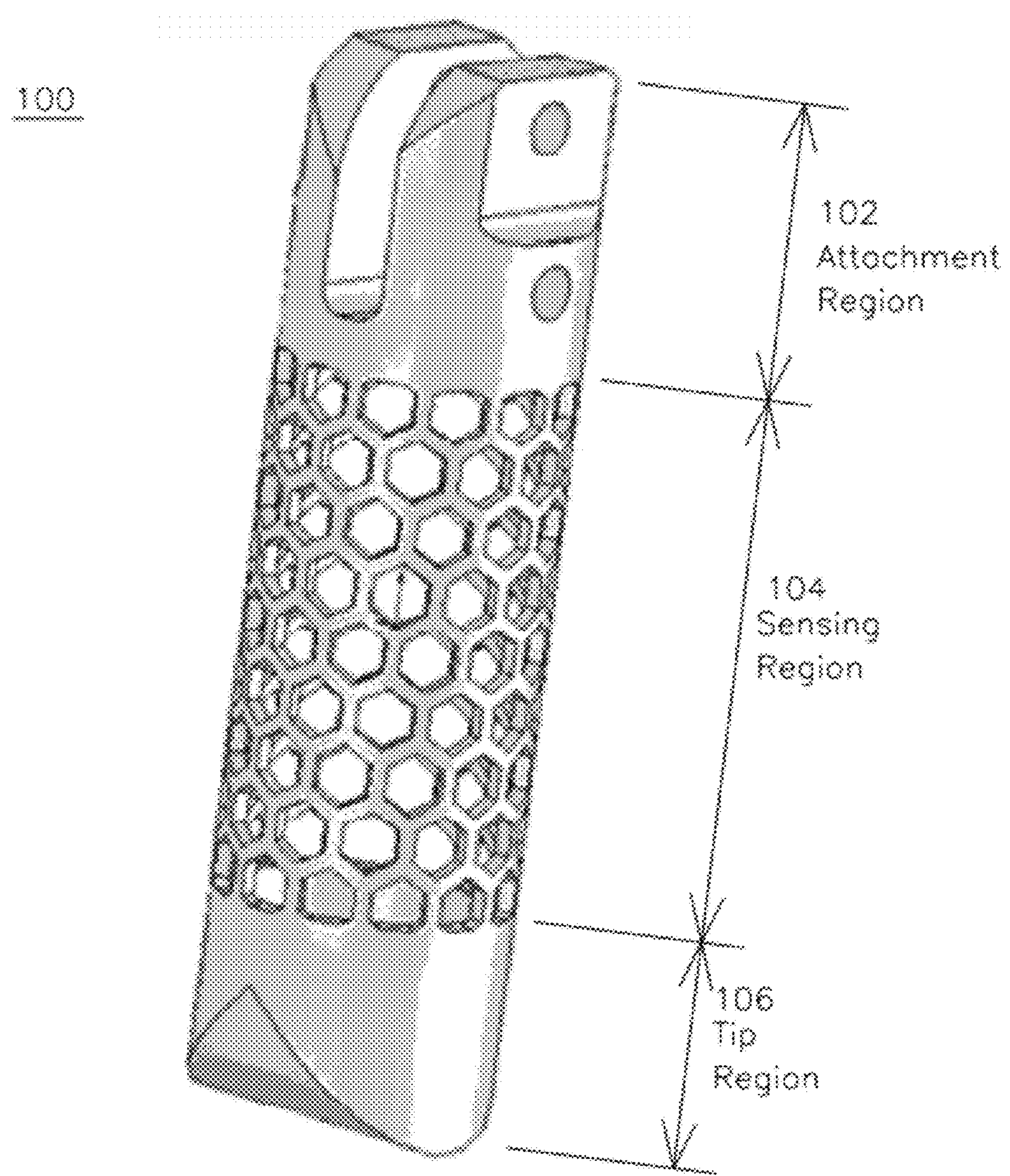
FIG. 1 is a perspective view of an elastomeric sensor.
Figure 2A:
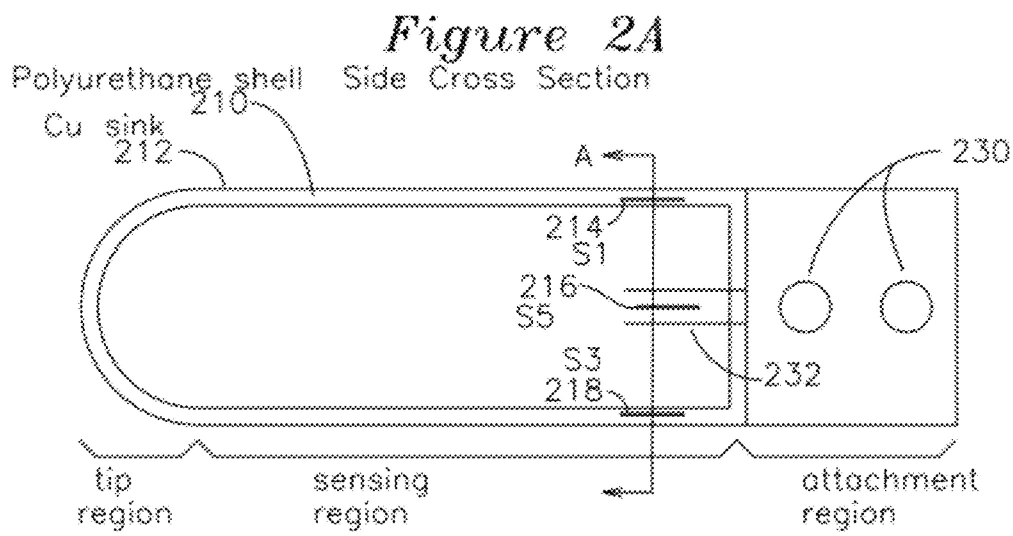
FIG. 2A is a cross section view of a sensor.
Figure 2B:
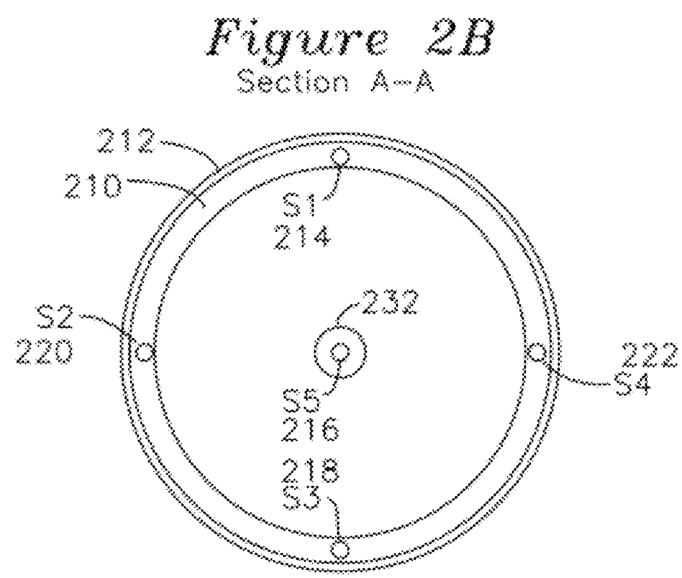
FIG. 2B is a section view of the sensor of FIG. 2A

FIG. 1 shows a perspective view of an example embodiment of a sensor finger 100 having an attachment region 102, a hollow sensing region 104, and a hollow tip region 106. The sensor is not limited in its dimensions, but in one example embodiment, the attachment region extent is approximately 35 mm, the sensing region extent is approximately 65 mm, and the tip region extent is approximately 20 mm with a cylindrical diameter of 35 mm. FIG. 2A shows a simplified cross section view of the sensor of FIG. 1, which includes a polyurethane shell 210 forming the tip region and sensing region, transitioning to a rigid attachment region including mounting holes 230. The shell 210 has a fiber optic cable embedded in it, which may route through passageways of the sensing region and tip region in any manner through the shell 210, and having a plurality of strain sensors formed as Bragg gratings in particular regions such as 214 and 218 of the shell 210. FIG. 2B shows a section A-A of FIG. 2A, including four such strain sensors S1 214, S3 218, S2 220, and S4 222. A control sensor S5 215 is positioned at the center, and is not exposed to strain, but measures temperature for use in compensating temperature effects from strain sensors S1, S2, S3, S4.

The exoskeletal structure of the shell 210 is light weight while maintaining relatively high strength. Since the sensing region structure deforms not only locally but globally depending on the location of force application, the sensor finger 100 is able to measure and localize applied forces. This is useful for both grasp force measurement and collision detection.

In one embodiment of the invention, the sensing region 104 has a hexagonally patterned shell. This pattern allows the structure to concentrate stresses and strains on the narrow ribs, facilitates embedded sensor placement and has an added effect of amplifying the sensor signal. Although two other regular polygons, triangles and squares, can also be used exclusively to form the shell pattern, the hexagon minimizes the ratio of perimeter to area. In addition, the hexagonal cells avoid sharp interior corners which could reduce the fatigue life. In summary, the hexagonal structure can minimize the amount of material for fabrication and the weight of the part while providing high structural strength. Although shown as a regular array of hexagonal aperture patterns, the sensor passageways could be formed many different ways and with various combinations of apertures, including pairs of apertures with a sensor placed therebetween, an array of sensors with circular symmetry, radial symmetry, or circumferential symmetry, and the passageways containing the sensors may have any orientation with respect to the axis of the sensing region 104.

Polymer structures unavoidably experience greater creep than metal structures. Creep adversely affects the linearity and repeatability of the embedded sensor output, both of which are mainly dependent on the stiffness and resilience of the structure. In addition, thermal changes can affect the FBG strain sensor outputs. A copper mesh 212 can be embedded into the outside of the shell, to reduce creep and provide thermal shielding. The high conductivity of copper expedites distribution of heat applied from outside the shell and creates a more uniform temperature gradient inside the shell.

Figure 3A:
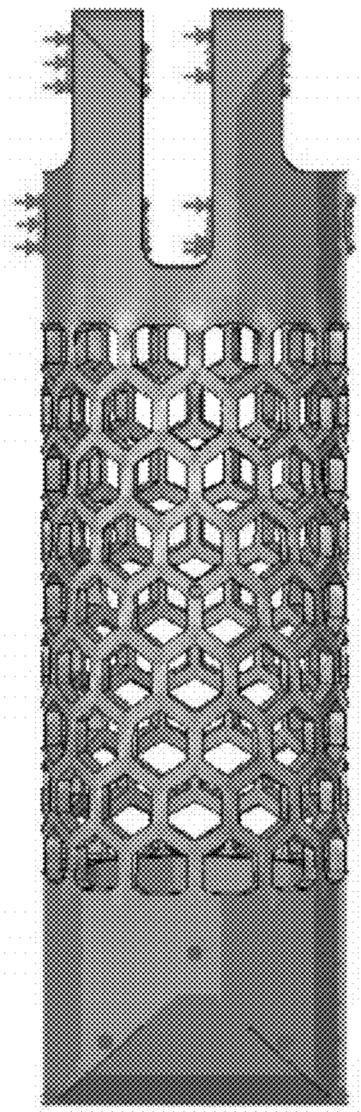
FIG. 3A is a front view of a sensor with a force applied to the tip.
Figure 3B:
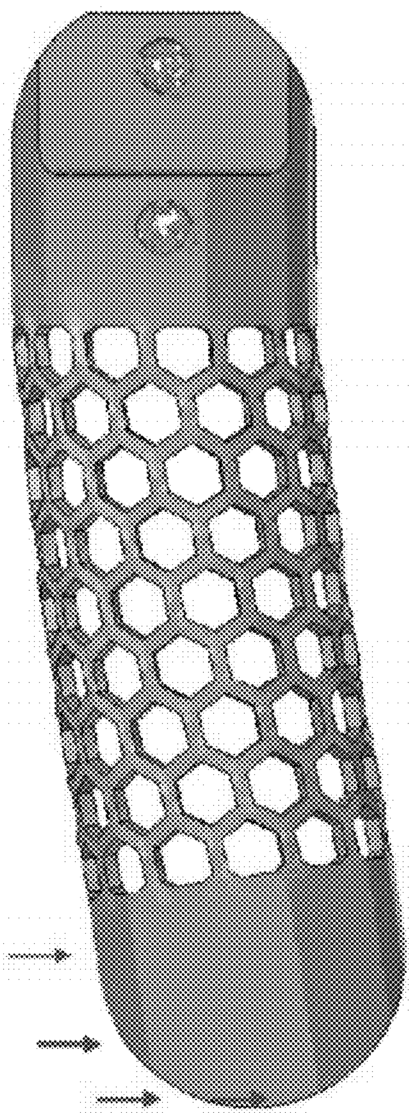
FIG. 3B is a side view of a sensor with a force applied to the tip.

Additional sensors provide more information and make the system more reliable. In an example embodiment, the force information obtained from the system includes longitudinal location, latitudinal location, magnitude of applied force, and orientation of the force vector. For simplicity, it will be assumed that forces are applied only in a normal direction to the surface. Since this assumption reduces the number of unknowns to three, a minimum of three linearly independent sensors are needed. In the present example, four strain sensors are embedded in the shell. Optimal sensor locations may be determined through the use of finite element analysis of the sensor shell. FIG. 3 shows strain distributions when different types of forces are applied to the shell and to the fingertip. Strain is most concentrated at the top of the shell where it is connected to the joint. Therefore, four sensors were embedded at 90° intervals into the first rib of the shell, closest to the joint, as shown in FIG. 2B, which also shows the center reference temperature sensor S5 216, which may be partially enclosed in a shielding cylinder 232 such as stiff copper or other structure to minimize short-term effects such as air currents.

Since embedded FBG sensors are sensitive to temperature change as well as strain change, it is necessary to isolate thermal effects from mechanical strains. Among the temperature compensation methods available are the dual-wavelength superimposed FBG sensors, saturated chirped FBG sensors, and an FBG sensor rosette. In contrast, a simpler method shown in the present example embodiment is the use of an isolated, strain-free FBG sensor S5 216 to directly measure the thermal effects. Subtracting the wavelength shift of this temperature-compensation sensor from that of any other sensor corrects for the thermal effects on the latter. An important assumption in this method is that all sensors are at the same temperature. The example embodiment of FIGS. 2A and 2B shows one temperature compensation sensor S5 216 in the hollow area in the middle of the shell 210 as shown in FIG. 2. Although the temperature compensation sensor S5 216 is physically removed from the strain sensors, the copper heat shield 232 is expected to create a more uniform temperature gradient inside the shell.

FIGS. 4A, 4B, 4C, 4D, 4E, 4F, 4G, 4H, 4I, 4J, and 4K shows the sequence of steps of a modified SDM process for prototype fabrication, which may be examined in combination with the below process steps:

Shell (Sensor Region) Part Fabrication:

FIG. 4A shows the preparation of a silicone rubber inner mold 402 with optical fiber 404 with FBG sensor 406 placed with the FBG sensors 406 in desired measurement passageways formed in the mold. Typically, multiple FBGs operating at the same or different wavelengths are employed on a single fiber, although only one is shown for clarity.

FIG. 4B shows the inner mold 402 with optical fiber 404 wrapped with copper screen mesh 410. In one embodiment of the invention, the screen mesh has a matching hole pattern for the apertures formed as pedestals into inner mold 402, and the pedestals may also have a formed lip to support the mesh 410 at a desired height above the cylindrical inner diameter of the inner form 402.

FIG. 4C shows a form void 414 produced by the gap between the inner mold 402 which has the screen 410 applied, and the outer form 416. Liquid polyurethane is then poured into the form gap 414.

FIG. 4D shows the formed sensing region 418 after curing of the polyurethane and removal of the inner and outer molds with embedded optical fiber 404 and copper mesh (not shown).

[Step 2] Tip Region Part Fabrication

FIG. 4E shows the preparation of the silicone rubber inner mold 430 and wax outer mold 432 with the copper mesh placed in the form void 431.

FIG. 4F shows the liquid polyurethane poured into the form void 431 produced by the inner 430 and outer 432 molds.

FIG. 4G shows the placement of the cured sensing region 418 from Step 1 into the uncured polyurethane void 434 of the tip region mold, thereby joining the formed sensing region 418 with the tip region.

FIG. 4H shows the tip and sensor regions after removal from the mold with the polyurethane cured, including strain sensor fiber 404.

[Step 3] Attachment Region Part Fabrication

FIG. 4I shows the preparation of the outer mold with the placement of the temperature compensation sensor structure including measurement fiber 444 with grating 446 located in shield cylinder 448, all of which is placed in base mold 442 with liquid polyurethane 440.

FIG. 4J shows the cured shell and fingertip parts placed into the uncured polyurethane.

FIG. 4K shows the completed sensor after removal of the outer mold when the polyurethane cures, including temperature measurement fiber 444 and strain measurement fiber 404.

The series of FIGS. 4A through 4F show just one embodiment for the steps of the Shape Deposition Manufacturing (SDM) process for the finger prototype fabrication. As is known in the prior art, it is difficult to make hollow three-dimensional parts using conventional SDM processes, since only the top of the part is accessible for machining. The outer mold 431 and 416 may be formed from hard wax to maintain the overall shape. In contrast, the inner mold 402 can be hollow and made of soft silicone rubber, which can be manually deformed and removed when the polyurethane is cured. The strain sensors and copper mesh can be embedded during these steps. The second series of steps is related to fingertip casting, which uses a separate mold and occurs after the shell 418 is fully cured. As it cures, the polyurethane for the fingertip 434 bonds to the cured polyurethane of the shell 418. In the final step, the attachment joint including temperature compensation structure 446 and 448 are cast. As with the fingertip, the joint bonds to the cured shell. Since the joint is not hollow, an inner mold is not needed during this step. Since the joint has no copper mesh, it was cast using a hard polyurethane (such as Task 9, Smooth-On, Easton, Pa., USA) to reduce creep, while the shell and fingertip can be cast from softer polyurethane (such as Task 3, Smooth-On, Easton, Pa., USA).

To evaluate the resulting structure, three different sets of tests were carried out to evaluate the static, dynamic, and thermal performance of the prototype. The static tests show how linear and repeatable the system is, the dynamic tests show how responsive the system is, and the thermal tests show how well the system compensates for errors caused by temperature change.

Figure 5A:
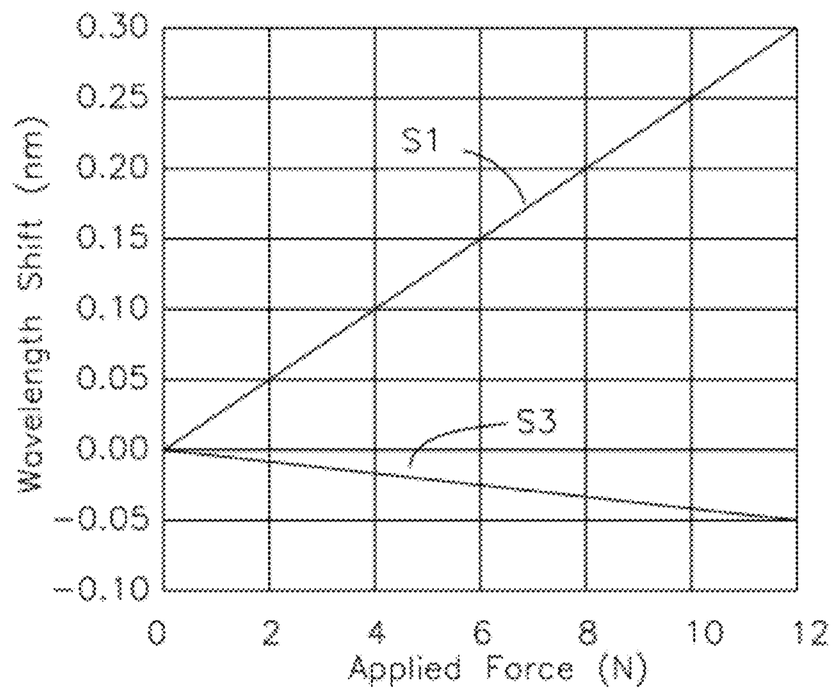
FIGS. 5A and 5B are plots of wavelength shift vs. applied force.
Figure 5B:
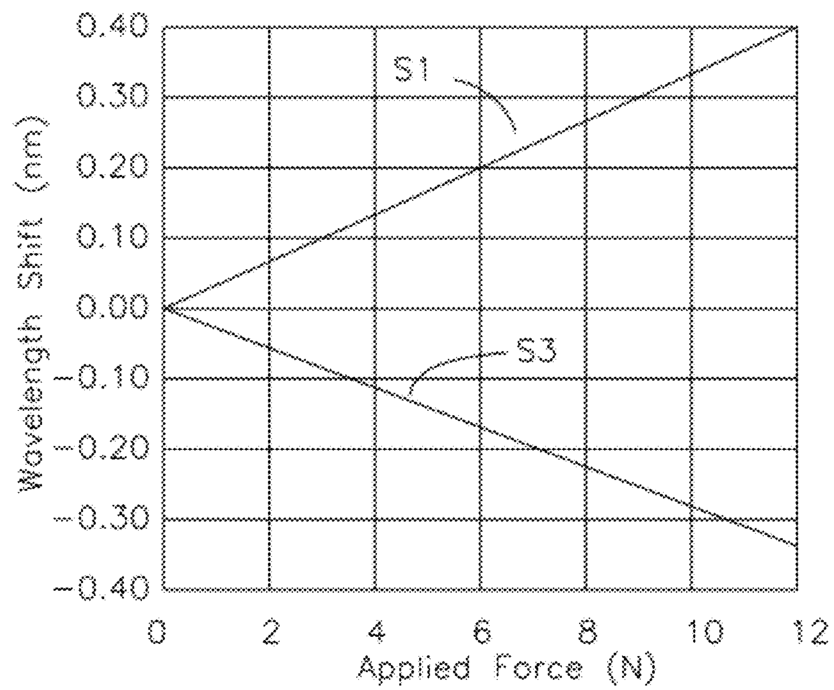

Static Tests Static forces were applied to two different locations on the finger: lattice shell region 104 and tip region 106. FIGS. 5A and 5B show the responses of two of the four sensors for a normal force applied in the sensing region and tip region, respectively. Applying a force to the shell yielded sensitivities of 0.024 nm/N and −0.0044 nm/N for sensor 51 and S3, respectively. The optical system can resolve wavelength changes of 0.5 pm or less, corresponding to 0.015 N or less for the minimum detectable force change. Note that the 51 sensor, being on the same side of the shell as the contact force, has a much higher sensitivity to it. Applying a force to the tip yielded sensitivities of 0.032 nm/N and −0.029 nm/N. In this case, the location of the force results in roughly equal strains at both sensors. For a given location, the ratio of the two sensor outputs is independent of the magnitude of the applied force. The plots of FIGS. 5A and 5B shows a maximum of 5.3% and 3.9% deviations from linear responses for shell and tip tests, respectively.

Figure 6A:
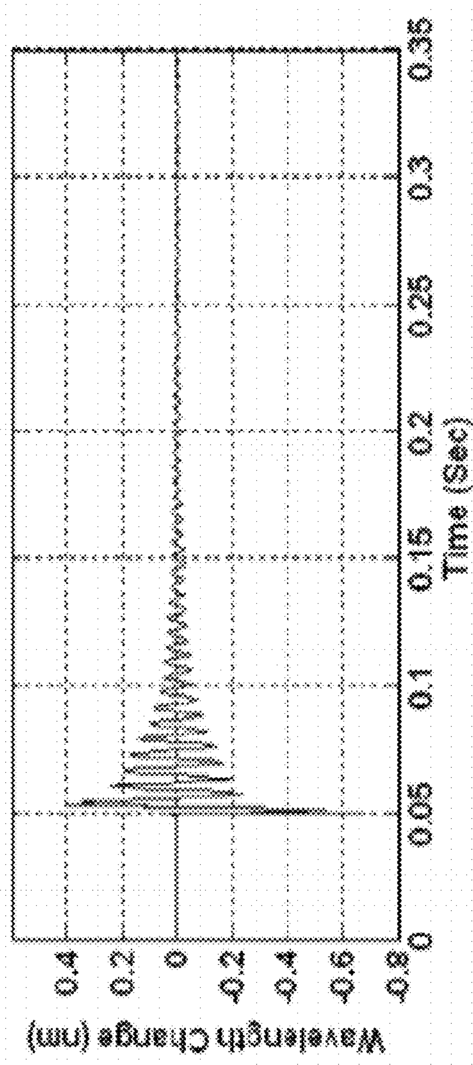
FIGS. 6A and 6B are plots of dynamic impulse response and its fast Fourier transform.
Figure 6B:
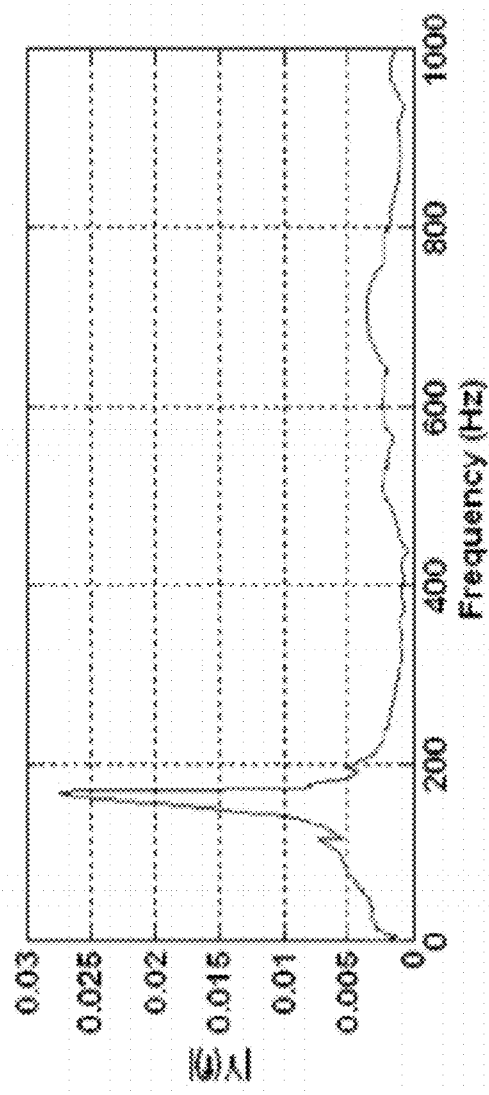

Characterization of the dynamic response of the sensorized fingers can be seen in FIGS. 6A and 6B, which show the impulse response (expressed as a change in the wavelength of light reflected by an FBG cell) and its fast Fourier transform (FFT). The impulse was effected by tapping on the finger with a light and stiff object. The FFT shows a dominant frequency around 167 Hz which is a result of the dominant vibration mode of the elastomer structure.

Figure 7:
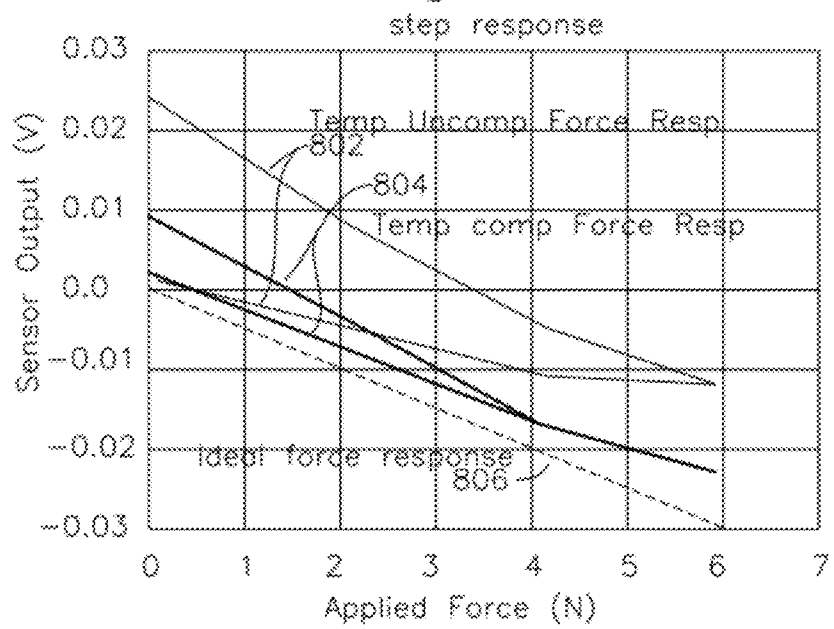
FIG. 7 is a plot of force measurement accuracy for temperature compensated and temperature uncompensated configurations.

FIG. 7 shows a typical thermal test results. Over a three minute period, the fingertip was loaded and unloaded while the temperature was decreased from 28.3 C to 25.7 C. The ideal (temperature invariant) sensor output is indicated by the dashed line 806. Experiment results show that use of the temperature compensation sensor of plot 804 reduces thermal effects, compared to the uncompensated plot 802.

Figure 9:
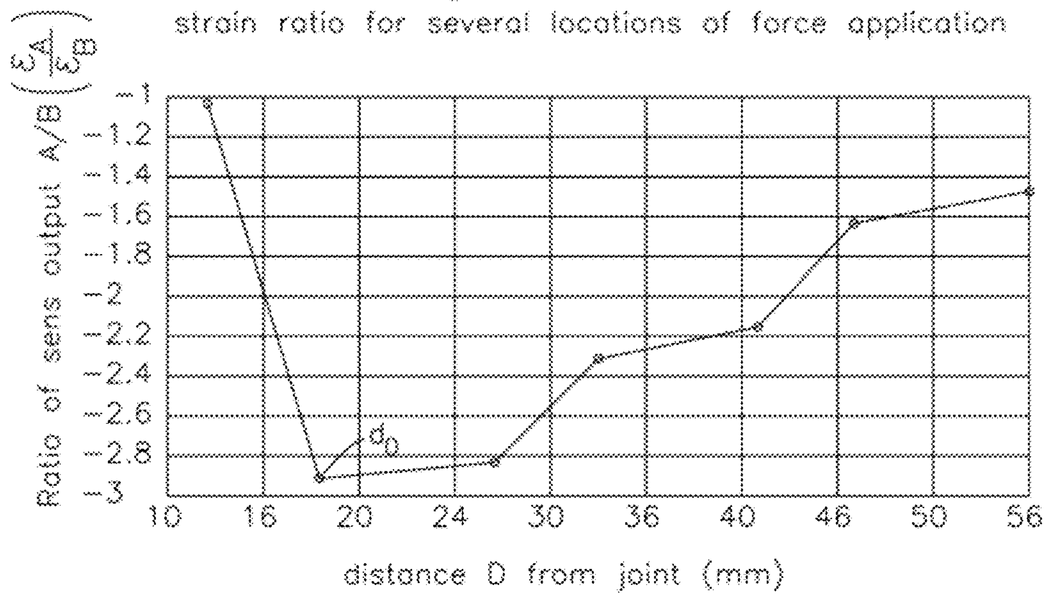
FIG. 9 is a plot of a strain ratio versus applied force along various points from the sensor joint.

Longitudinal localization requires some understanding of structural deformation of the shell. FIG. 8A shows simplified two-dimensional diagrams of one embodiment of the invention. When a force is exerted at a certain location, as shown in FIG. 8A, the structure will deform and sensors A and B will measure strains $\epsilon_A$ and $\epsilon_B$, respectively as indicated. This situation can be decomposed into two separate effects, as shown in FIGS. 8B and 8C. By superposition, $\epsilon_A=\epsilon_1+\epsilon_2$ and $\epsilon_B=\epsilon_3$. Therefore, if the ratio of $\epsilon_A$ to $\epsilon_A$ is known, it is possible to estimate D, the longitudinal location of the force. FIG. 9 shows the plot of experimental ratios of $\epsilon_A$ to $\epsilon_B$ as a function of D. There is some ambiguity in the localization, since two values of D result in the same ratio. However, if we let d0 be the distance at which $\epsilon_A/\epsilon_B$ is minimized, and we restrict operation to the region d>d0, the ambiguity can be resolved. Further, if the sensor locations are positioned closer to the other surface of the shell, d0 approaches 0 and it is possible to localize an applied force closer to the joint.

Figure 10:
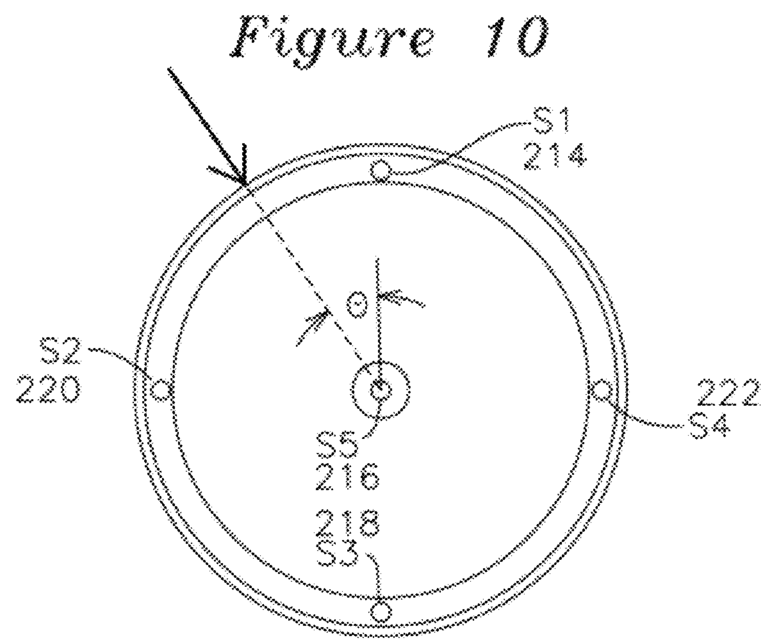
FIG. 10 is a top view of a sensor at a region of applied force.
Figure 11:
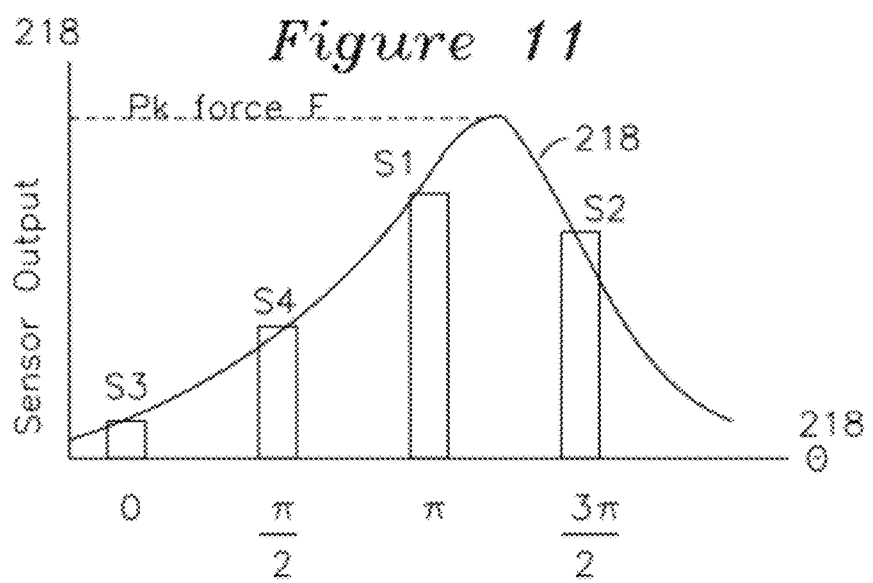
FIG. 11 is a plot of sensor output for the sensors of FIG. 10.

Latitudinal location can be approximated using centroid and peak detection, and only one point contact force is assumed in this method. FIG. 10 shows a cross sectional view of the finger with four strain sensors and an applied contact force indicated, and FIG. 11 shows its corresponding sensor signal outputs. The two sensors closest to the force location will experience positive strains (positive sensor output), and the other two sensors negative strains (negative sensor output), regardless of the longitudinal location of the force, if d>d0. However, since all the sensor signals must be non-negative to use the centroid method, all signal values must have the minimum signal value subtracted from them. Then, it is possible to find the angular orientation ⊖ of the contact force:

$$\theta = \frac{\Sigma \phi_i S_i'}{\Sigma S_i'} - \alpha$$

for i=1, 2, 3, 4, where S'=Si−min{S1,S2,S3,S4}, φ1=α, and $\phi_k=\phi_{k-1}+\pi/2$, for k=2, 3, 4 (if $\phi_k \geqq 2\pi$, $\phi_k=\phi_k-2\pi$), Si is the output signal from sensor i, and α is the clockwise angle between sensor 1 and the sensor with the minimum output signal value. This method produced errors less than 2°, corresponding to less than 0.5 mm on the perimeter, and an offset of 1.5° in the FEM simulation.

The FBG sensors can be interrogated using a system such as IFOS I*Sense, described in U.S. Pat. Nos. 7,127,132, 6,895,132, 6,788,835, 6,751,367, and 6,597,822, which are incorporated herein by reference. This type of interrogator relies on parallel photonic processing whereby multiple sensors are placed in series on a single fiber, which in combination with the ability to place sensors over the many channels of the sensor 100, has the near-term potential to combine high channel counts (>100 sensors on a single fiber), high resolution (sub-microstrain), and high speed (>5 kHz) with a miniaturized footprint. As previously discussed, the application of strain on each FBG produces a shift in the wavelength that is linearly proportional to the strain. An FBG interrogator is used to precisely measure, for each FBG, the reflected wavelength shift and thus the strain applied to that FBG. Interrogators can be tunable (examining each FBG sequentially) or parallel processing in nature—the latter approach, which forms the basis of the preferred interrogator system, has advantages in terms of speed particularly when dealing with many sensors.

Figure 12:
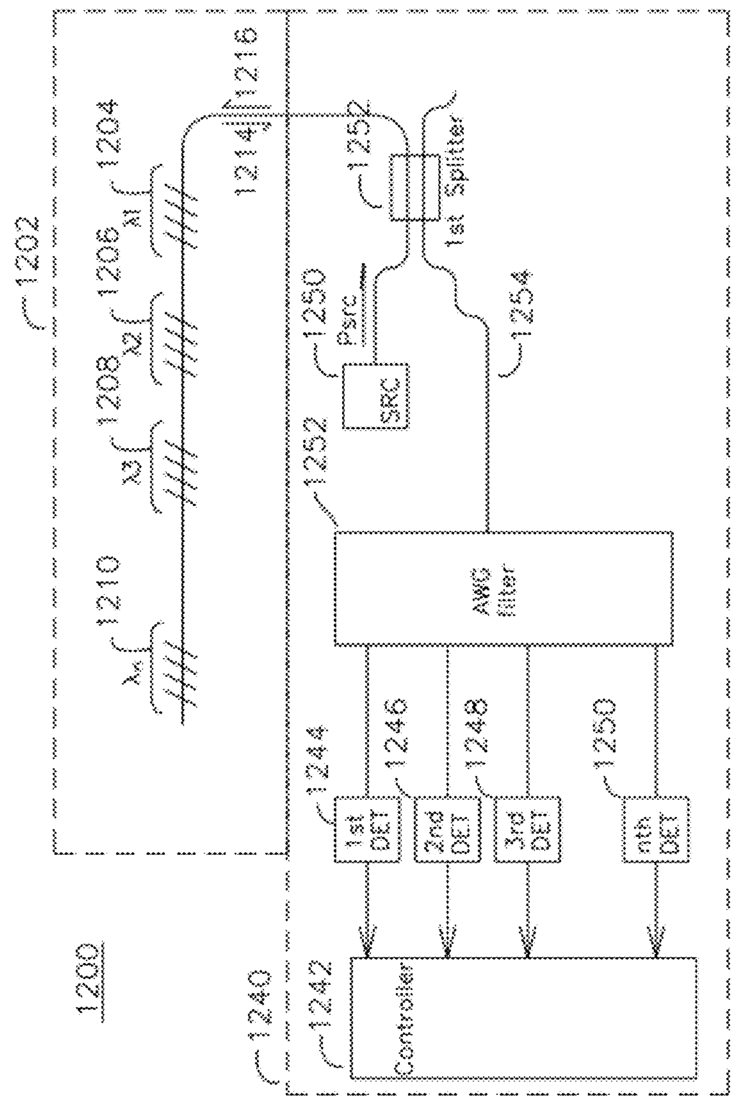
FIG. 12 is a block diagram for a wavelength discriminator coupled to a series connection of FBGs.

One example of a fiber interrogation system is shown in FIG. 12. A broadband source 1250 sends light through the optical circulator or splitter 1252 to an array of series FBGs 1202, each of which 1204, 1206, 1208, 1210 reflects a different Bragg wavelength. The reflected light 1214 is then returned through the optical circulator 1252 to the photonic processor which both demultiplexes the light using AWG filter 1252 coupled to detectors 1244 through 1250 and provides the basis for a ratiometric approach to measuring each of the returned wavelengths through conversion to different signals in various outputs from the multi-channel photodetector array. A controller 1242 containing electronics and software compares the ratios of optical stimulation across the detectors to provide the final conversion of the arrayed signals to wavelength and eventually the strain to which each FBG is subjected. One type of device for generating a plurality of outputs for ratiometric measurement is a specially formed arrayed waveguide grating (AWG) 1252, which may have filter response skirts which are optimized for wavelength discrimination, rather than the typical purpose of isolating adjacent wavelengths.

While the above description describes examples for particular embodiments of the invention, there are many different ways in which the invention can be practiced. Although the elastomeric sensor used a rapid prototyping process utilizing polyurethane, other variations of shape deposition manufacturing can be used to support the fabrication of hollow, plastic mesh structures with embedded components. In the present embodiments, the fiber optic sensors were embedded near the base of a cylindrical shell with hexagonal elements for high sensitivity to imposed loads, although the sensors could be placed in other locations in the sensing region. With more precise location of the sensors, or calibration of a particular sensor to a particular interrogator, higher sensitivities and accuracies are possible. As the frequency limit is imposed by the mechanical finger system, other materials can be used in capturing the sensors to allow the measurement of dynamic strains to frequencies of 5 kHz or more.

The 80 mesh 0.0055" dia copper wire mesh embedded in the structure reduces the amount of viscoelastic creep and provides thermal shielding. A single FBG temperature compensation sensor at the center of the hollow finger helps to reduce the overall sensitivity to thermal variations. However, the central sensor is sufficiently distant from the exterior sensors that changes in temperature can produce noticeable transient signals. This effect can be reduced using a larger number of sensors and locating thermal compensation sensors near the exterior of the structure, where they undergo the same transient thermal strains as the other sensors.

For simplicity, a 4 strain sensor with orthogonal axis was described. With a larger number of sensors, more accurate contact localization is possible. Increasing the total number of sensors is relatively straightforward as multiple FBG sensors can be located along the same fiber with optical multiplexing.

Furthermore, while the FBG strain and temperature sensors are described as single (longitudinal) axis sensors in single-core glass fiber, it is possible to use bend sensors based on multi-core fiber supporting FBGs, as well as the use of polymer optical fiber Bragg grating sensors in flexible robotic skins, and eventually a multiplicity of multiplexed physical and chemical fiber-optic sensors.

The invention claimed is:

1. A method for manufacturing a sensor having:

a first step of placing an optical fiber into a cylindrical inner shell form, said inner shell form having an array of posts directed substantially outward, said optical fiber routed in the gaps between said posts;

a second step of placing the optical fiber and cylindrical shell form into an enclosing outer shell form which is in contact with at least one of said outward directed posts, where a substantially cylindrical void is formed between said inner shell form and said outer shell form;

a third step of filling said void with an elastomeric material to thereby create a sensor middle part;

a fourth step of forming a cap and an attachment;

a fifth step of attaching said cap on one end of said sensor middle part and attaching said attachment on the opposite end of said sensor middle part.

2. The method of claim 1 where said fourth step cap and said attachment are formed from the same elastomeric material as said third step sensor middle part.

3. The method of claim 1 where said fourth step attachment includes fiber optic leads from said optical fiber.

4. The method of claim 1 where said fourth step attachment includes a temperature sensor.

5. The method of claim 4 where said temperature sensor is an optical fiber having a Bragg grating.

6. The method of claim 1 where said optical fiber has Bragg gratings, and said first step placing said optical fiber includes placing said optical fiber such that said Bragg gratings are located between said posts and in areas where stress of deflection can be measured.

7. The method of claim 1 where said optical fiber has a plurality of Bragg gratings disposed in distinct locations on said fiber, each said Bragg grating operative for a different wavelength, and said first step includes placing said optical fiber such that each said Bragg grating is located between said posts and in areas where stress of deflection can be measured in each axis for measurement of deflection.

8. The method of claim 1 where said posts have a cross section which is at least one of:

hexagonal, square, or triangular.

9. A method for manufacturing a sensor using an outer mold, an inner mold, and an optical fiber having at least one grating formed therein, the method having the steps:

placing said inner mold within said outer mold after placement of an optical fiber between posts which are either part of said inner mold or part of said outer mold;

filling a void between said outer mold and said inner mold with an elastomer;

where said at least one grating is positioned in a region between two adjacent said posts.

10. The method of claim 9 where said grating is a fiber Bragg grating.

11. The method of claim 9 where said optical fiber has at least three gratings which are positioned with substantially 120 degrees of separation about an axis of said inner mold.

12. The method of claim 9 where said optical fiber has at least four gratings which are positioned with substantially 90 degrees of separation about an axis of said inner mold.

13. The method of claim 9 where said outer mold and said inner mold also form a closed end cap.

14. The method of claim 9 where said void forms a substantially cylindrical region having an extent.

15. The method of claim 9 where said posts have one of the cross sections of hexagonal, triangular, or square.

16. The method of claim 9 where said placement of an optical fiber includes placing a wire mesh in said void.

17. A method for making a shape and deflection sensor, the method having the steps:

making an outer form with a substantially cylindrical middle section;

making an inner form for placement inside said outer form and forming a void there between;

placing an optical fiber having Bragg gratings in the gaps between posts formed in either said outer form or said inner form which extend into said void;

placing a liquid elastomeric material in the void formed between said outer form and said inner form;

curing said elastomeric material until said elastomeric material has hardened;

removing said cured elastomeric material from said outer form and said inner form.

18. The method of claim 17 where one of said bragg gratings is a temperature measurement grating which is placed in a non-deflecting region of said elastomeric material.

19. The method of claim 17 where said gratings are fiber Bragg gratings placed in a single optical fiber, each said Bragg grating responsive to a unique range of wavelengths.

20. The method of claim 17 where said posts have a cross section which is at least one of hexagonal, square, or triangular.

21. The method of claim 17 where said placing an optical fiber step includes a copper mesh in said void.

* * * * *